(12) United States Patent
Kato

(10) Patent No.: US 7,922,439 B2
(45) Date of Patent: Apr. 12, 2011

(54) INDUSTRIAL ROBOT

(75) Inventor: Hisaki Kato, Kariya (JP)

(73) Assignee: Denso Wave Incorporated, Tokyo (JP)

(*) Notice: Subject to any disclaimer, the term of this patent is extended or adjusted under 35 U.S.C. 154(b) by 234 days.

(21) Appl. No.: 12/314,569

(22) Filed: Dec. 12, 2008

(65) Prior Publication Data
US 2009/0155027 A1  Jun. 18, 2009

(30) Foreign Application Priority Data

Dec. 13, 2007  (JP) ................. 2007-322249

(51) Int. Cl.
*B25J 19/00* (2006.01)
(52) U.S. Cl. ............... 414/744.3; 414/744.1; 74/490.01; 901/14
(58) Field of Classification Search ............... 414/744.1, 414/744.2, 744.3; 74/490.01; 901/15, 16
See application file for complete search history.

(56) References Cited

U.S. PATENT DOCUMENTS

| 4,904,514 A * | 2/1990 | Morrison et al. ............... 428/53 |
| 7,101,137 B2 * | 9/2006 | Schwarz et al. .......... 414/222.01 |
| 7,422,773 B2 * | 9/2008 | D'Andreta .................... 427/483 |

FOREIGN PATENT DOCUMENTS

JP  U-60-042594  3/1985

* cited by examiner

*Primary Examiner* — Donald Underwood
(74) *Attorney, Agent, or Firm* — Oliff & Berridge, PLC

(57) ABSTRACT

A robot comprises a fixed member that has a lower end, a movable member, and an elastic sheet member. The movable member is supported by the fixed member to be movable between an uppermost position and a lowermost position of a movable range given to the movable member in a vertical direction relative to the fixed member. This movable member has a lower end at which an operation tool is provided The elastic sheet member has both ends. Of these ends, one end is fixed to the lower end of the fixed member and the other end is fixed to the lower end of the movable member. This sheet member droops when the movable member moves up to the uppermost position of the fixed member.

7 Claims, 5 Drawing Sheets

INDUSTRIAL ROBOT

CROSS REFERENCES TO RELATED APPLICATION

The present invention relates to and incorporates by reference Japanese Patent application No. 2007-322249 filed on Dec. 13, 2007.

BACKGROUND OF THE INVENTION

1. Field of the Invention

The present invention relates to an industrial robot having a movable member that moves in a straight line in the vertical direction relative to a fixed member.

2. Description of the Related Art

There have been provided industrial robots having a movable member that moves in the vertical direction relative to a fixed member.

This type of robot has to have structure that can prevent dust from being disturbed, which is generated by a mechanism including the movable member that moves in the vertical direction relative to the fixed member (for example, the rack and pinion mechanism). Such a structure is introduced in Japanese unexamined utility model publication No. 60-42594, which discloses an accordion-type cover.

However, the structure having the accordion-type cover, which can prevent dust from flying around, can cause the dust collected on the bottom of the cover to scatter around when the cover is removed for maintenance. The dust scattered around has to be collected, and the collection (cleaning) of the scattered dust requires labor time and consequently less easy maintenance of the robot.

SUMMARY OF THE INVENTION

The present invention has been invented in view of such problems, and it is therefore an object of the present invention to provide a robot with easy maintenance.

In order to achieve the object, as one aspect of the invention, there is provided a robot comprising a fixed member that has a lower end, a movable member that is supported by the fixed member to be movable between an uppermost position and a lowermost position of a movable range given to the movable member in a vertical direction relative to the fixed member and that has a lower end at which an operation tool is provided, and an elastic sheet member that has two ends, one end of which is fixed to the lower end of the fixed member and the other of which is fixed to the lower end of the movable member such that the elastic sheet member droops when the movable member moves up to the uppermost position of the fixed member.

Accordingly, flying dust is collected in a drooping portion of the elastic sheet member. Therefore, removal of the elastic sheet member in the drooped posture from the fixed member and the movable member allows easy disposal (cleaning) of the dust and easy maintenance of the robot without allowing the dust collected in the drooping portion of the elastic sheet member to scatter around.

Preferably, the robot further comprises fixing means for fixing each of the ends of the elastic sheet member to one of the lower ends of the fixed and movable members, respectively.

It is preferred that the fixing means for fixing the elastic sheet member to the fixed member is provided at a position in such a manner that the distance from the movable member is the same as the vertically exposed length of the movable member below the lower end of the fixed member, when the movable member moves to the lowermost position relative to the fixed member.

Accordingly, the movable member at the uppermost position relative to the fixed member allows the elastic sheet member to form such a drooping portion that is apart from the fixed member for a distance one half of the vertical length of the elastic sheet member below the lower end of the fixed member at the time the movable member is at the lowermost position. This allows the drooping portion to be far apart from the operation area of the operation tool, and can prevent the drooping portion from interfering with the operation tool. Therefore, the robot of the invention can protect the motion of the operation tool from any disturbance caused by the elastic sheet member, and can prevent the elastic sheet member from any damage caused by direct contact with the operation tool.

It is further preferred that the elastic sheet member is formed in such a manner that one half from the fixing means of the fixed member side to its center is heavier than the other half. This can also allow the drooping portion to far apart from the operation area of the operation tool, and can prevent the drooping portion from interfering with the operation tool.

Further preferably, one of the ends of the elastic sheet member which is fixed to an end of the lower end of the fixed member is the farthest from the movable member and the other end of the elastic member is fixed to an end of the lower end of the movable member which is the nearest to the fixed member.

It is also preferred that one of the ends of the elastic sheet member is fixed to a position other than an end of the lower end of the fixed member which is the farthest from the movable member.

Further preferably, the elastic sheet member has a base portion and rising portions which rises from the base portion, the rising portions extending in a direction crossing the vertical direction.

DETAILED DESCRIPTION OF PREFERRED EMBODIMENTS

Figure 1:
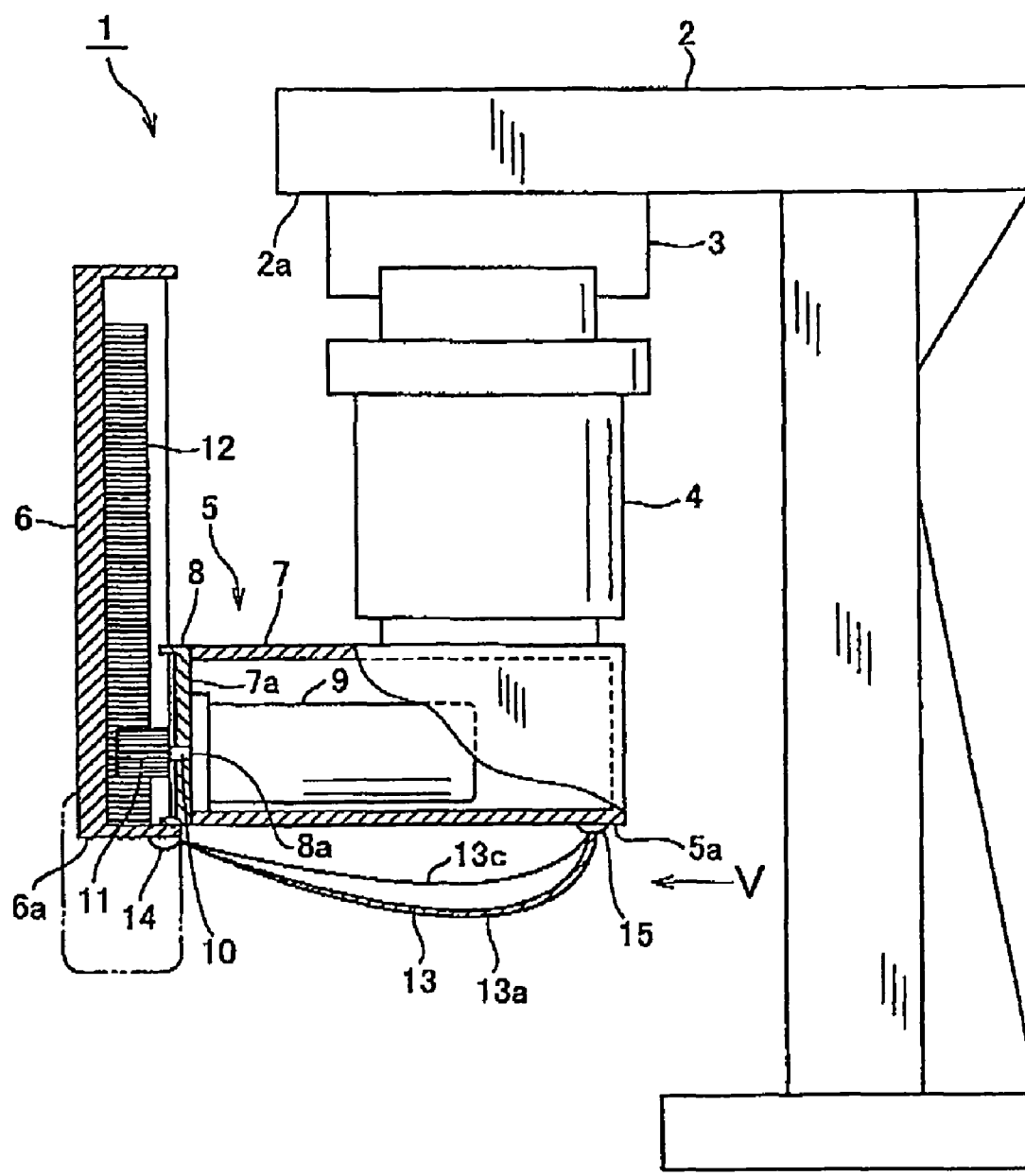
FIG. 1 is a partly broken vertical cross sectional view showing a preferred embodiment of the invention.

A preferred embodiment of the present invention applied to a suspended type robot will be described referring to the drawings. As shown in FIG. 1, the suspended type robot 1 (which will simply be referred to as a "robot") comprises a base 4 fixed to a ceiling 2a of a stand 2 via a driving with 3, an arm 5 (which corresponds to the fixed member in the present invention) connected to the base 4, and a slider 6 (which corresponds to the movable body in the present invention) movably connected to the arm 5 in the straight vertical direction relative to the arm 5. The arm 5 consists of a unit 7 having an opening 7a and a cover 8 that closes the opening 7a. The horizontal axis type of an elevating motor 9 is provided inside the unit 7 closer to the lower side thereof. A rotary shaft 10 of the elevating motor 9 extends forward through a through-hole 8a formed in the cover 8. A metal made pinion 11 is fixed to the apical end of the rotary shaft 10, constructing the rack and pinion mechanism that converts the rotational motion to the linear motion.

A metal made rack 12 constructing the rack and pinion mechanism is disposed inside the slider 6 in the vertical direction. The rack 12 engages with the pinion 11, and the activated elevating motor 9 causes the slider 6 to move straight in the vertical direction relative to the arm 5, as the rotational movement of the pinion 11 is transmitted to the rack 12.

Figure 4:
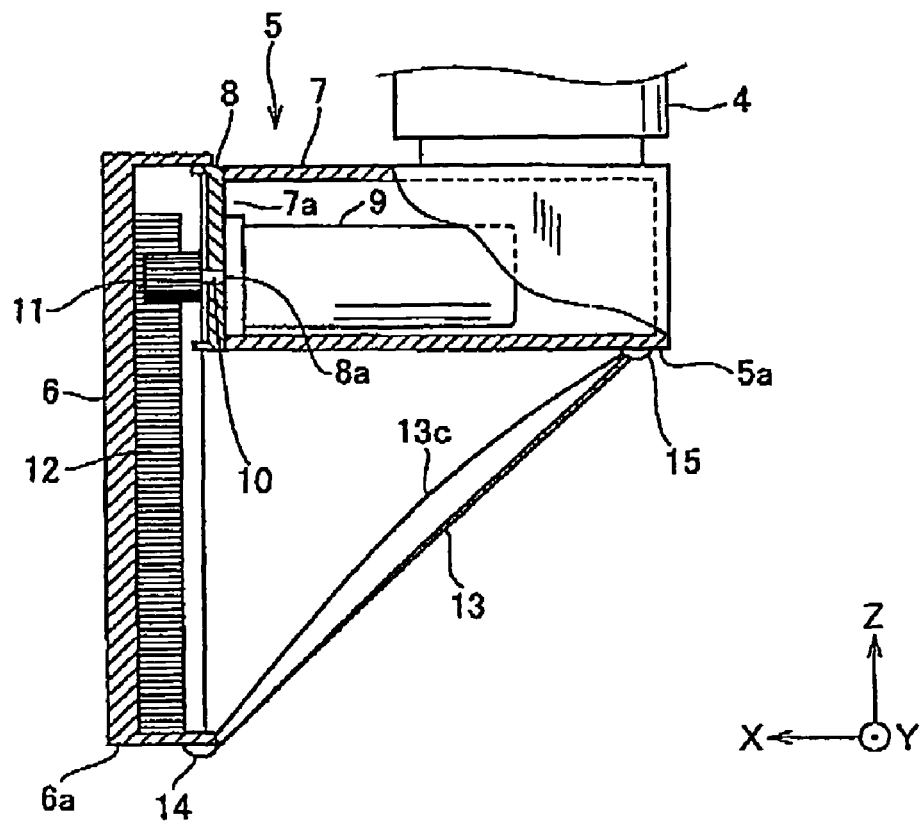
FIG. 4 is a partially broken vertical cross sectional view showing the slider taking a position at its lowermost position

An elastic sheet member 13 such as a rubber sheet is attached over the region between the lower end 6a of the slider 6 and the lower end 5a of the arm. An attaching portion for attaching an operation tool (for example, a hand for holding a work piece) is provided at the lower end 6a of the slider 6 on the far side from the arm 5 (on the left side in FIG. 1). A fixing means 14 for fixing the elastic sheet member 13 to the slider 6 is provided at the side of the arm 5 apart from the attaching portion (on the right side in FIG. 6). A fixing means 15 for fixing the elastic sheet member 13 to the arm 5 is provided at a position in such a manner that it allows the elastic sheet member 13 to droop when the slider 6 is moved to the uppermost position relative to the arm 5 (as shown in FIG. 1), and its distance from the slider 6 is the same as the vertically exposed length of the slider 6 below the lower end 5a of the arm 5, when the slider is moved to the lowermost position relative to the arm 5 (as shown in FIG. 4).

Figure 2A:
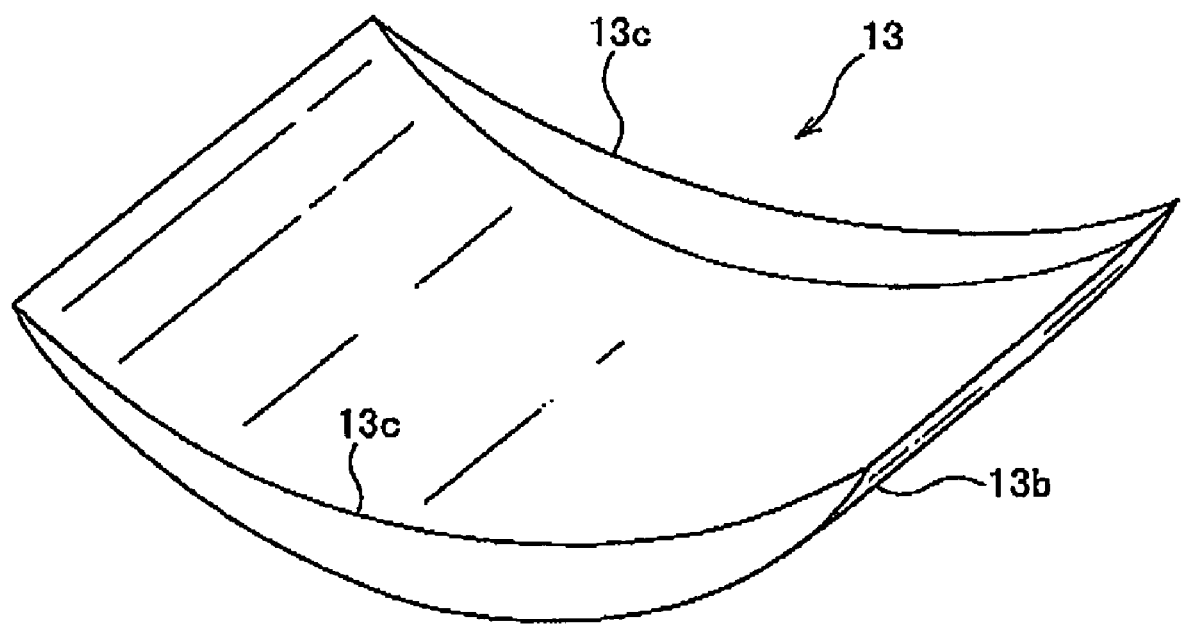
FIG. 2A is a perspective view of the elastic sheet member.
Figure 2B:
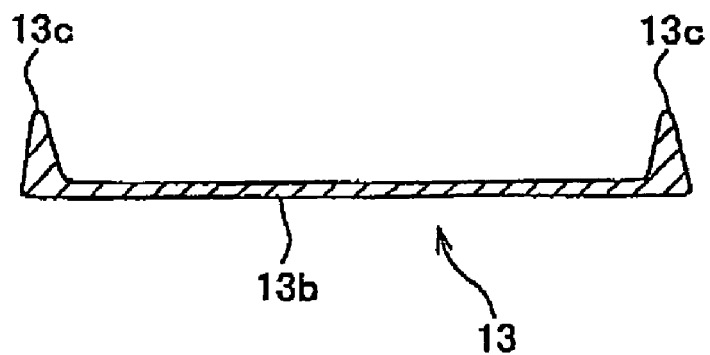
FIG. 2B shows a cross section viewed from the direction of an arrow V.
Figure 3:
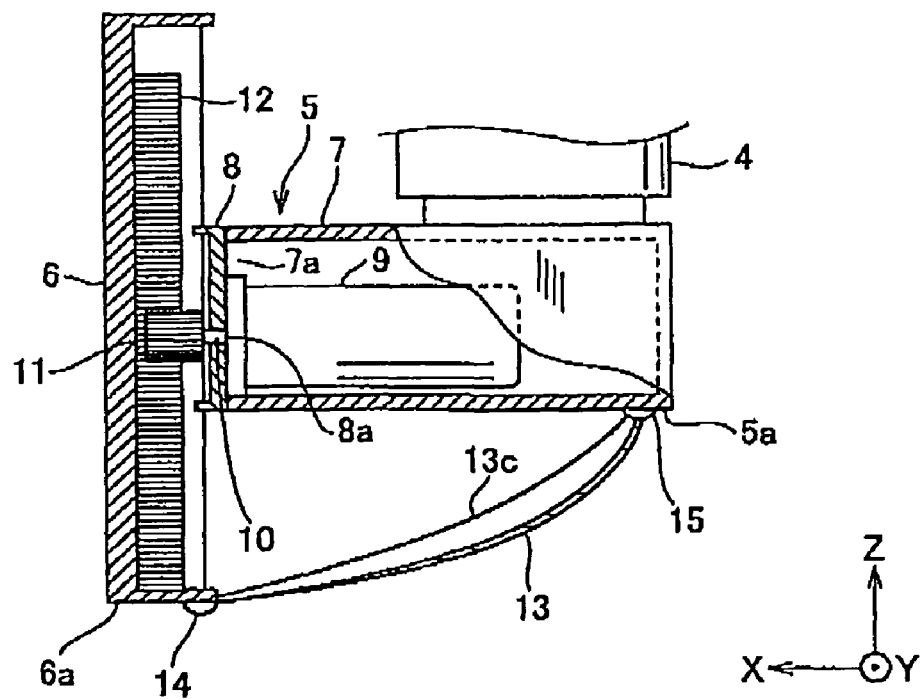
FIG. 3 is a partially broken vertical cross sectional view showing the preferred embodiment where a slider takes a position between its uppermost position and lowermost position.

The elastic sheet member 13, as shown in FIGS. 2A and 2B, has a base portion 13b and rising portions 13c which rises from the based portion 13b, the rising portions 13c extending in a direction crossing the vertical direction.

Further, the thickness of the elastic sheet member 13 is not uniform but is uneven wherein the thicker portion is disposed at the side of the arm 5 while the thinner portion is disposed at the side of the slider 6. The elastic sheet member 13 is attached in such a manner. Accordingly, when the slider 6 is moved to the uppermost position relative to the arm 5, a drooping portion 13a of the elastic sheet member 13 is formed at one side of the center adjacent to the arm 5, apart from the slider 6 ("the center" refers to the midpoint between the two fixing means 14, 15).

The slider 6 moved to the lowermost position relative to the arm 5 causes the elastic sheet member 13 to fully extend, stretching the drooping portion. The linear reciprocation of the slider 6 between the uppermost position and the lowermost position relative to the arm 5 causes the elastic sheet member 13 to repeatedly droop and extend. The fixing means of the elastic sheet member 13 to the lower end 6a of the slider 6 and the lower end 5a of the arm 5 can be formed by a tightening screw, an adhesive tape, a pinching clamper, etc. Specifically, the fixing means 14, 15 can be integrated with the elastic sheet member 13, and the integrated fixing means 14, 15 can be fixed to the lower end 6a of the slider 6 and the lower end 5a of the arm 5 by the screw or by the adhesive tape or the like. Further, the fixing means 14, 15 having the pinching mechanism can be attached to the lower end 6a of the slider 6 and the lower end 5a of the arm 5, and the edge portions of the elastic sheet member 13 can be pinched by the fixing means 14, 15 attached to the lower ends 5a, 6a.

Figure 5:
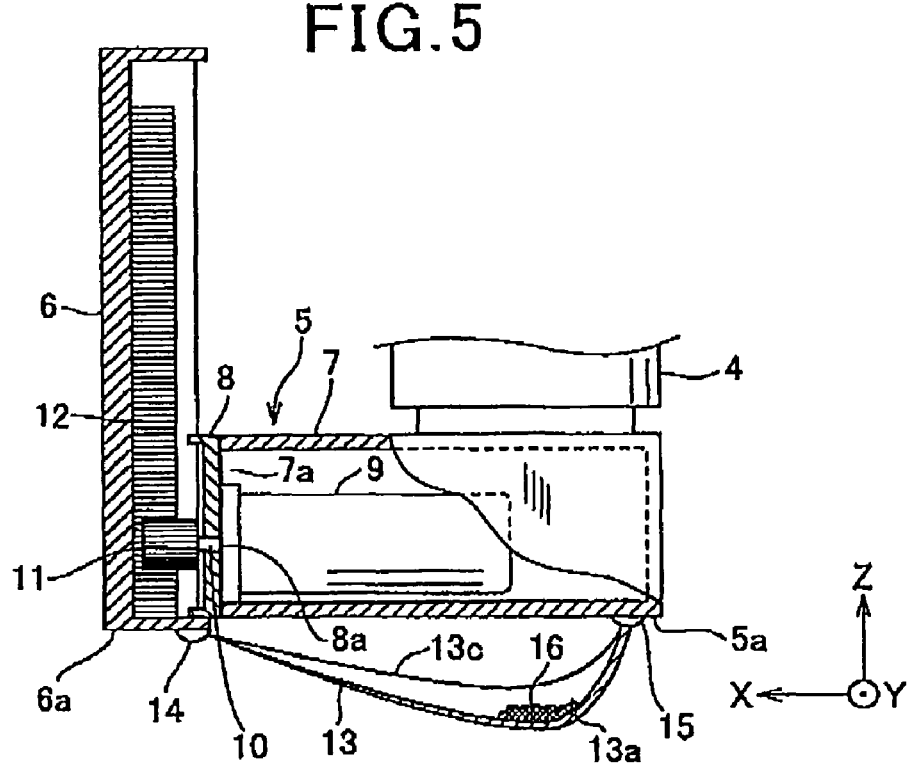
FIG. 5 is a partially broken vertical cross sectional view showing the slider at its uppermost position with collected dust.
Figure 6:
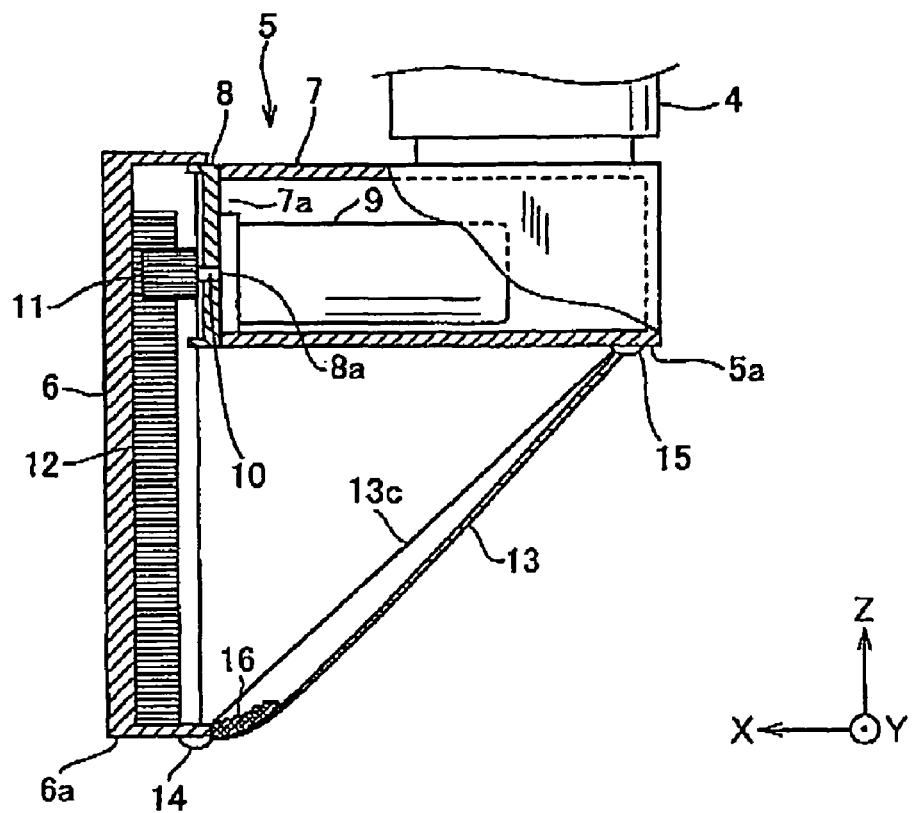
FIG. 6 is a partially broken vertical cross sectional view showing the slider at its lowermost position with collected dust.
Figure 7:
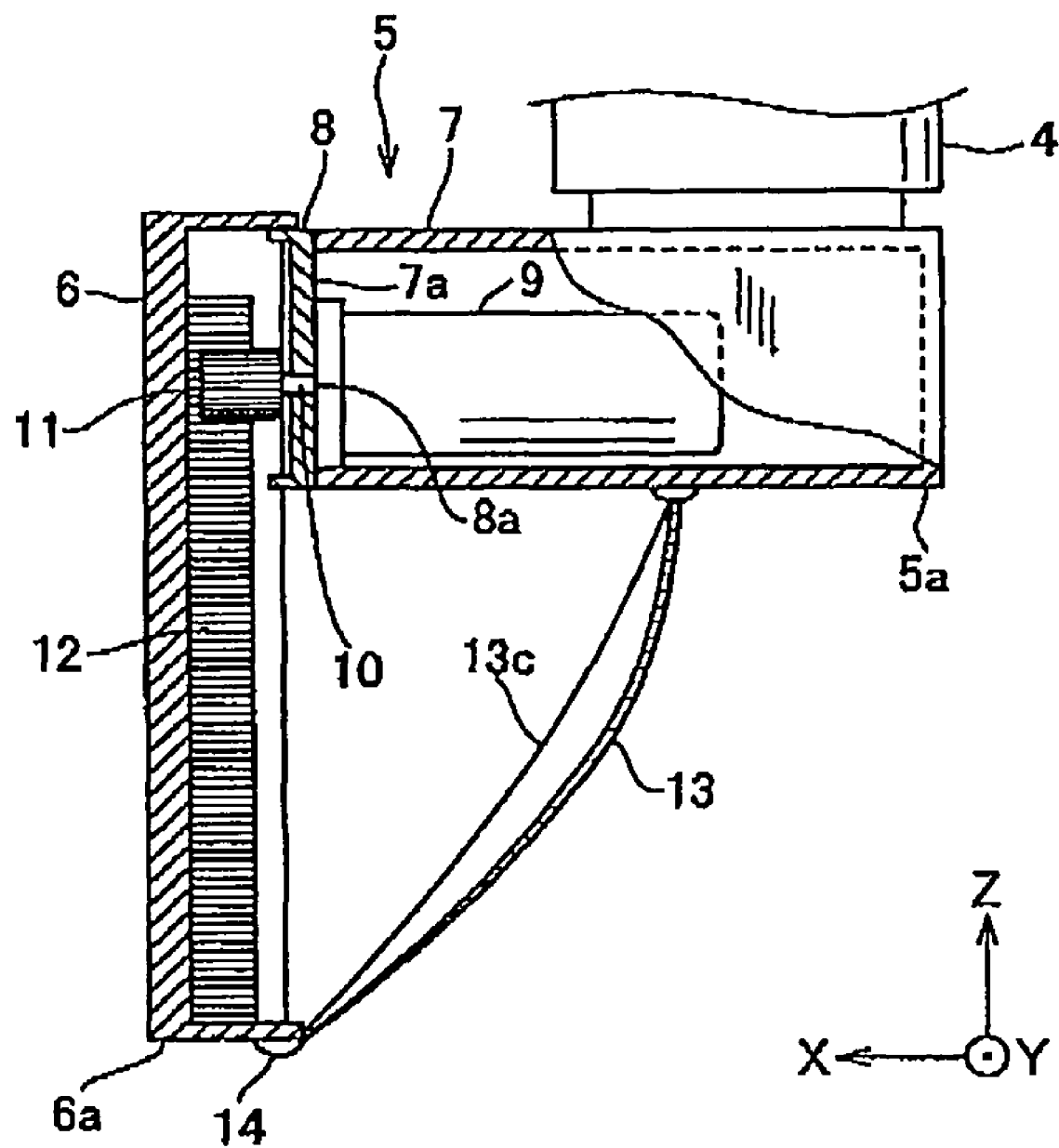
FIG. 7 shows an example deformation of the preferred embodiment of the invention.

The above-mentioned robot construction having the rack and pinion mechanism, which is the mechanism for converting the rotational motion to linear motion, comprises the metal made pinion 11 and the metal made rack 12 which are greased for the pinion 11 to smoothly rotate on the rack 12. Therefore, the rotational movement of the pinion 11 on the rack 12 can cause the grease and metal powder to be scattered around. The robot 1 according to the preferred embodiment comprises the elastic sheet member 13 fixed over between the lower end 6a of the slider 6 and the lower end 5a of the arm 5. Accordingly, the slider 6 moved to the uppermost position relative to the arm 5 causes the elastic sheet member 13 to droop, so that, as shown in FIG. 5, the flying grease and the metal powder are collected in the drooping portion 13a of the elastic sheet member 13. Further, as shown in FIG. 6, the slider 6 moved to the lowermost position relative to the arm 5 causes the flying grease and the metal powder to be collected in the lower portion (at the side of the fixing means 14) of the elastic sheet member 13. Accordingly, the scattered grease and the metal powder are prohibited from scattering around. Thus, an operator can dispose the grease 16 and the metal powder 16 collected in the drooping portion 13a of the elastic sheet member 13 by removing the elastic sheet member 13 without letting them scatter around. The elastic sheet member 13 can be removed by detaching the fixed portion 14 of the elastic sheet 13 in the drooped posture from the lower end 6a of the slider 6 as well as by detaching the fixing means 15 from the lower end 5a of the arm 5, when the slider 6 is at the uppermost position relative to the arm 5.

The robot 1 according to the preferred embodiment, which comprises the elastic sheet member 13 fixed over between the lower end 6a of the slider 6 and the lower end 5a of the arm 5, can collect the flying grease 16 and the metal powder 16 in the drooping portion 13a of the elastic sheet member 13, because it allows the elastic sheet member 13 to droop when the slider is moved to the uppermost position relative to the arm. Accordingly, removal of the elastic sheet member 13 in the drooped posture can provide easy disposal (cleaning) of the grease 16 and the metal powder 16 collected in the drooping portion 13a of the elastic sheet member 13 as well as easy maintenance, without allowing the grease 16 and the metal powder 16 to scatter around.

Further, the fixing means 15 for fixing the elastic sheet member 13 to the arm 5 is provided at a position in such a manner that its distance from the slider 6 is the same as the vertically exposed length of the slider 6 below the lower end 5a of the arm 5, when the slider is moved to the lowermost position relative to the arm 5. Accordingly, the slider 6 at the uppermost position relative to the arm 5 allows the elastic sheet member 13 to form a drooping portion 13a that is apart from the arm 5 for a distance one half of the vertical length of the elastic sheet member 13 below the lower end 5a of the arm 5 when the slider 6 is at the lowermost position. This allows the drooping portion 13a to be far apart from the operation area of the operation tool, and can prevent the drooping portion 13a from interfering with the operation tool.

Further, the elastic sheet member 13 is formed in such a manner that one side of its center adjacent to the arm 5 is heavier than the other side, so that the drooping portion 13a of the elastic sheet member 13 is formed at the side of the arm 5, when the slider 6 is moved to the uppermost position relative to the arm 5. This can also allow the drooping portion 13a to be far apart from the operation area of the operation tool, and can prevent the drooping portion 13a. from interfering with the operation tool. Further, the slider 6 at the lowermost position relative to the arm 5 causes the elastic sheet member 13 to extend, which can perfectly prevent the drooping portion 13a from interfering with the operation tool. Moreover, unlike the conventional prior art making use of the accordion-type cover, the robot 1 in the preferred embodiment of the present invention does not have to comprise a supporting member for supporting the accordion-type cover, which advantageously presents a simple robot structure.

While the present invention has been disclosed in terms of the preferred embodiment in order to facilitate better understanding thereof, it should be appreciated that the invention can be embodied in various ways without departing from the principle of the invention.

For example, in this embodiment, one of the ends of the elastic sheet member 13 is fixed to the end of the lower end of the arm 5 which is the farthest from the slider 6 and the other end of the elastic sheet member 13 is fixed to the end of the lower end of the slider 6 which is the nearest to the fixed member. However, one of the ends of the elastic sheet member 13 can be fixed to a position other than an end of the lower end of the arm 5 which is the farthest from the slider 6.

Further, the mechanism for transferring the rotational motion to the linear motion can be constructed by a ball screw mechanism composed of a ball screw shaft and a ball nut, other than the rack and pinion mechanism. Further, the elastic sheet member 13 may have a weight to make one side relative to its center that is adjacent to the arm 5 is heavier than the other side.

What is claimed is:

1. A robot comprising:
   a fixed member that has a lower end;
   a movable member that is supported by the fixed member to be movable between an uppermost position and a lowermost position of a movable range given to the movable member in a vertical direction relative to the fixed member and that has a lower end at which an operation tool is provided; and
   an elastic sheet member that has two ends, one end of which is fixed to the lower end of the fixed member and the other of which is fixed to the lower end of the movable member such that the elastic sheet member droops when the movable member moves up to the uppermost position of the fixed member.

2. The robot as claimed in claim 1, further comprising fixing means for fixing each of the ends of the elastic sheet member to one of the lower ends of the fixed and movable members, respectively.

3. The robot as claimed in claim 2, wherein the fixing means for fixing the elastic sheet member to the fixed member is provided at a position in such a manner that a distance from the fixing means to the movable member is the same as a vertically exposed length of the movable member below the lower end of the fixed member, when the movable member moves to the lowermost position relative to the fixed member.

4. The robot as claimed in claim 1, wherein the elastic sheet member is formed in such a manner that one half from the fixing means of the fixed member side to a center of the elastic sheet member is heavier than the other half.

5. The robot as claimed in claim 1, wherein one of the ends of the elastic sheet member is fixed to an end of the lower end of the fixed member which is the farthest from the movable member and the other end of the elastic member is fixed to an end of the lower end of the movable member which is the nearest to the fixed member.

6. The robot as claimed in claim 1, wherein one of the ends of the elastic sheet member is fixed to a position other than an end of the lower end of the fixed member which is the farthest from the movable member.

7. The robot as claimed in claim 1, wherein the elastic sheet member has a base portion and rising portions which rise from the base portion, the rising portions extending in a direction crossing the vertical direction.

\* \* \* \* \*